Nov. 25, 1924.                                               1,516,594
                          A. I. FISCHER
            ADJUSTABLE FLANGE FOR VALVES, BIBS, AND FAUCETS
                       Filed Sept. 28, 1923
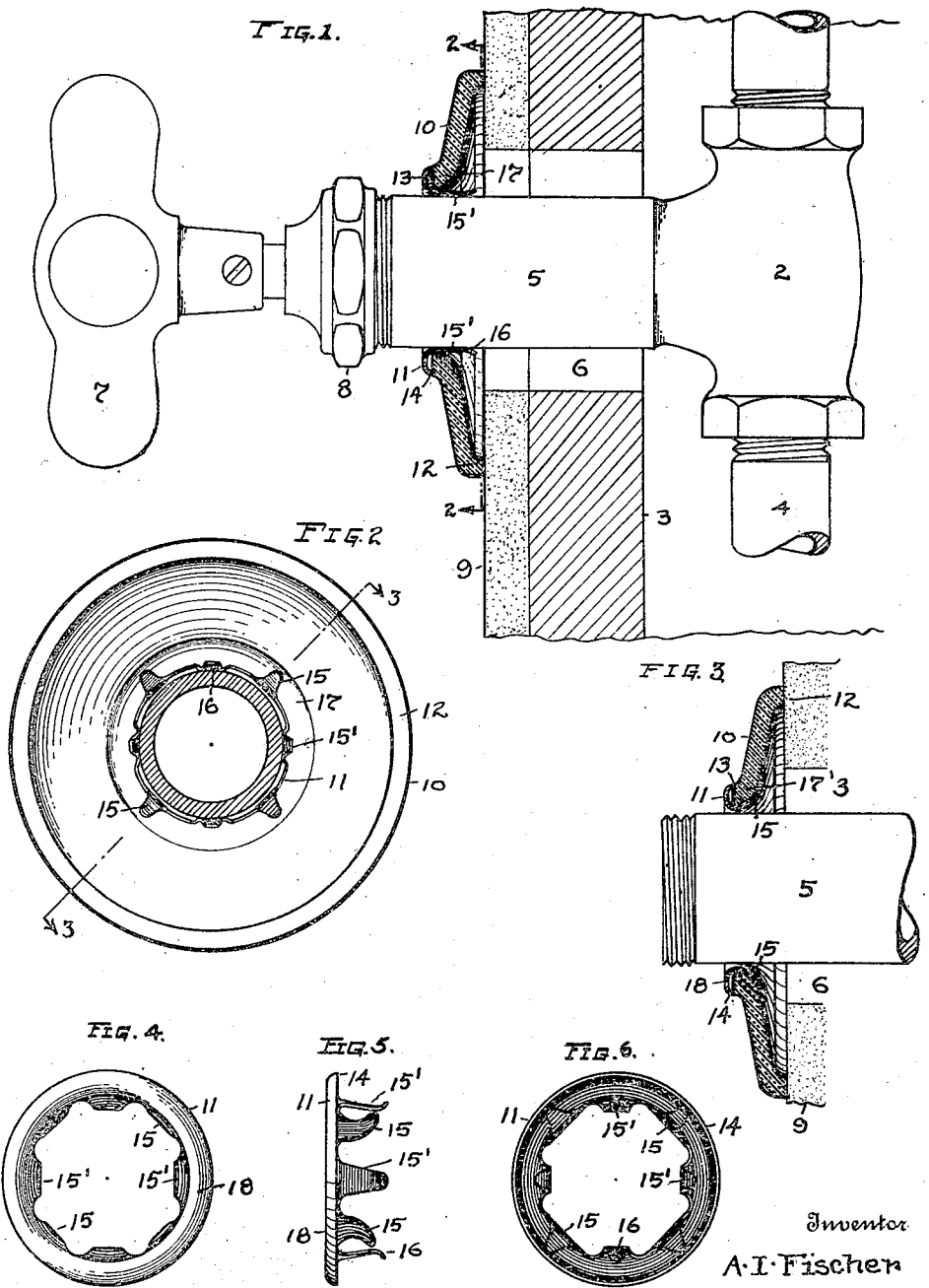
Inventor
A. I. Fischer Patented Nov. 25, 1924.

1,516,594

UNITED STATES PATENT OFFICE.

ARTHUR I. FISCHER, OF CLEVELAND HEIGHTS, OHIO, ASSIGNOR TO MORRIS H. GLAUBER, OF CLEVELAND, OHIO.

ADJUSTABLE FLANGE FOR VALVES, BIBS, AND FAUCETS.

Application filed September 28, 1923. Serial No. 665,331.

*To all whom it may concern:*

Be it known that I, ARTHUR I. FISCHER, a citizen of the United States, residing at Cleveland Heights, in the county of Cuyahoga and State of Ohio, have invented certain new and useful Improvements in an Adjustable Flange for Valves, Bibs, and Faucets, of which the following is a specification.

The present invention relates more particularly to an improvement in an adjustable wall flange and flange holder for a water distributing or controlling device, such as a valve, bib, faucet, pipe or a spout. Thus in mounting a valve or spout, upon or within a wall or other supporting or confining part it is customary to sleeve an independent finishing flange over the exposed portion of the tubular body, shank or pipe which is connected with the supply pipe behind the wall, and the flange serves to cover the opening or gap in the wall through which the tubular body, shank or pipe projects. In many instances, for example in a bath room, the wall itself is enameled or made of tile, porcelain or vitreous material, and it is desirable to match this finish and use a faucet handle and also a wall flange of the same material. One object of this invention is to provide a spring holder for porcelain or vitreous china flanges, the holder being particularly constructed to effect a detachable clamping connection with the wall flange and also an adjustable clamping connection with the tubular or cylindrical part upon which it is sleeved.

In the accompanying drawing, Fig. 1 is is a side view of a valve or faucet having a part thereof projecting through a wall and showing my improved flange and spring clamp in section thereon.

Fig. 2 is a rear view of the flange and its spring clamp sleeved upon a tubular section, this view corresponding to a view taken on line 2—2 of Fig. 1.

Fig. 3 is a sectional view of the flange and clamp taken on line 3—3 of Fig. 2.

Figs. 4, 5 and 6 are front, side and rear elevations, respectively, of the spring holder alone.

In Fig. 1, I show a valve body 2 mounted at the rear of a wall or partition 3 and connected with a water supply pipe 4. A tubular shank or extension 5 projects from body 2 through an opening 6 in wall 3, and the operating handle 7 and packing nut 8 of the valve are exposed at the front of wall 3, together with a portion of shank 5. In a bib or faucet installation the body is mounted outside of the wall and the tubular shank 5 projects into and connects with supply pipe 4 behind the wall, but in either case it is customary to sleeve a separate flange upon the tubular shank and fit it tightly and snugly against the outer face of wall 3 to close the opening or gap in the wall. Assuming this wall to have a tiled or enameled face 9, I may with the present invention mount a vitreous-china or porcelain flange 10 any desired shape in cross section upon shank 5 to match the finished wall, using a spring metal clamping ring or collar 11 to hold the flange in securely locked position upon shank or extension 5. Flange 10 may be in the form of a recessed disk or ring, either shallow or deep, and preferably cone-shaped with a narrow flat seating edge 12 at its base to engage wall 3, and a flat circular projecting portion 13 at its center and outer end to seat the clamping ring or collar 11 which is pressed from spring sheet metal. The body of ring or collar 11 is pressed concavo-convex in cross section to provide a short bearing flange or lip 14 at its outer edge which is adapted to abut against the flat end face 13, and the inner annular edge of the collar is formed at equi-distant points radially thereof with a series of spring tongues 15 which extend rearwardly into the recessed portion of flange 10 when the two pieces are assembled and united together. As shown there are eight tongues in all, arranged alternately in sets of four, the four tongues marked 15 being curved outwardly away from the axis to fit and snugly clamp the inner rounded border portion 17 of the central opening in flange member 10 at points opposite the flat end face 13. The remaining four tongues, marked 15′, are inclined horizontally on straight lines toward the axis and the tips 16 thereof are bent back slightly to permit the spring collar to be freely sleeved upon shank 5 and to frictionally engage the round wall thereof with a firm clamping pressure. The alternate arrangement of spring tongues on collar 11 thus serves to lock the collar detachably to flange member 10 and also adjustably upon shank 5, and the endless rounded body portion 18 of collar 11 provides a finished bead for the middle projecting part of the flange member. The spring tongues may be readily bent to fit shanks of slightly varying diameters, or collars of different sizes may be substituted for each other in making attachments with flange members of the same diameter or of different shapes.

What I regard as my invention or discovery, and desire to claim, is:

1. An adjustable wall flange for a water distributing or controlling device, comprising an annular body having a separate collar centrally therein, said collar having spring tongues adapted to frictionally engage a cylindrical part of said device and permitting longitudinal slip adjustment of the flange thereon.

2. A finishing flange for a water distributing device having a shank or extension, comprising an annular member of vitreous material; and a metal collar having locking portions adapted to secure said collar within the center of said annular member, and provided with spring tongues adapted to hold said collar and member adjustably upon said shank or extension.

3. An annular finishing member for a water distributing device, having a central opening surrounded by a raised border, and a metal collar bearing against the front of said raised border and provided with locking projections opposite thereto and formed with integral spring tongues extending rearwardly through said central opening.

In testimony whereof I affix my signature hereto this 18th day of September, 1923.

ARTHUR I. FISCHER.